US006986248B2

(12) United States Patent
Overhoff

(10) Patent No.: US 6,986,248 B2
(45) Date of Patent: Jan. 17, 2006

(54) METHOD AND DEVICE FOR DOSING A LIQUID REDUCING AGENT

(75) Inventor: Werner Overhoff, Marl (DE)

(73) Assignee: PURěM Abgassysteme, Menden (DE)

( * ) Notice: Subject to any disclaimer, the term of this patent is extended or adjusted under 35 U.S.C. 154(b) by 174 days.

(21) Appl. No.: 10/266,049

(22) Filed: Oct. 7, 2002

(65) Prior Publication Data

US 2003/0154712 A1 Aug. 21, 2003

(30) Foreign Application Priority Data

Oct. 5, 2001 (DE) .......................................... 101 49 275

(51) Int. Cl.
*F01N 3/00* (2006.01)

(52) U.S. Cl. .......................................... 60/286; 60/274
(58) Field of Classification Search ................... 60/286, 60/301, 303, 274; 239/128, 129, 132.3, 132.5
See application file for complete search history.

(56) References Cited

U.S. PATENT DOCUMENTS

| | | | | | |
|---|---|---|---|---|---|
| 5,522,218 A | * | 6/1996 | Lane et al. | ................... | 60/274 |
| 5,605,042 A | * | 2/1997 | Stutzenberger | ............... | 60/286 |
| 6,050,088 A | * | 4/2000 | Brenner | ........................ | 60/303 |
| 6,192,677 B1 | * | 2/2001 | Tost | .............................. | 60/286 |
| 6,442,932 B1 | * | 9/2002 | Hofmann et al. | ............. | 60/274 |
| 6,513,323 B1 | * | 2/2003 | Weigl et al. | ................... | 60/286 |
| 6,526,746 B1 | * | 3/2003 | Wu | .............................. | 60/286 |

FOREIGN PATENT DOCUMENTS

| DE | 195 31 028 A1 | 2/1995 |
|---|---|---|
| DE | 198 18 448 A1 | 10/1999 |
| DE | 200 21 401.2 | 3/2001 |

* cited by examiner

*Primary Examiner*—Thomas Denion
*Assistant Examiner*—Diem Tran
(74) *Attorney, Agent, or Firm*—Margaret Polson Patent Law Offices of Rick Martin, P.C.

(57) ABSTRACT

A method and a device for dosing a liquid reducing agent for denoxing the exhaust gases of a diesel engine, wherein the reducing agent is delivered to the exhaust gas system of the diesel engine via a dosing valve. The reducing agent is cooled for the elimination of gas bubbles entrained in the reducing agent present at the input side of the dosing valve.

15 Claims, 2 Drawing Sheets

METHOD AND DEVICE FOR DOSING A LIQUID REDUCING AGENT

CROSS REFERENCE APPLICATIONS

This application claims priority from German application no. 101 49 275.8-13 filed Oct. 5, 2001.

FIELD OF INVENTION

The present invention relates to a method for dosing a liquid reducing agent for denoxing the exhaust gases of a Diesel engine by delivering a specific quantity of reducing agent from a dosing valve for introduction into the exhaust gas system of the diesel engine. The invention further relates to a device for dosing a liquid reducing agent for the supply into the exhaust gas system of a Diesel engine by having a dosing valve connected into a supply line.

BACKGROUND OF THE INVENTION

To reduce the noxious substances comprised in the exhaust gas flow of a diesel engine a denoxing process can be carried out apart from other measures. Such a denoxing process has become known as the SCR method (Selective Catalytic Reduction). In order to be able to carry out the reduction of the nitric oxides on a catalyst suitable for this purpose, a reducing agent must first be added to the exhaust gas flow. The reducing agent employed is ammonia ($NH_3$). As described in DE 200 21 401 U1, the $NH_3$ is drawn in the liquid state from a tank, generally a pressure tank. The withdrawn $NH_3$ is conducted via a supply line from the $NH_3$ tank into the exhaust gas system. Connected in the supply line is a dosing valve actuated by a control mechanism. Different quantities of nitric oxide are present in the exhaust gas flow as a function of the operating state of the diesel engine. In order to be able to carry out maximum reduction of the nitric oxides on the SCR catalyst, a quantity of $NH_3$ matched to the nitric oxide quantity present in the exhaust gas flow must be supplied as the reducing agent. Consequently, it is essential that the supplied $NH_3$ quantity is sufficient to be able to ensure as much as possible the complete reduction of the nitric oxides contained in the exhaust gas flow. On the other hand, for the best possible utilization of resources, the intent is to inject into the exhaust gas flow only that quantity of $NH_3$ which is actually required for carrying out the denoxing process as defined.

The device described in DE 200 21 401 U1 is capable of carrying out the exact dosing of the liquid $NH_3$ present at the dosing valve. However, driving situations may occur, in particular when the tank is largely emptied, in which gaseous $NH_3$ is drawn by the withdrawal nozzle and not liquid $NH_3$. In this case in the supply line an $NH_3$ gas bubble is entrained. However, dosing takes place under the precondition that liquid $NH_3$ is present at the dosing valve. Consequently, in the event gaseous $NH_3$ is dosed without detection, too small a quantity of $NH_3$ is delivered to be capable of completely reducing the nitric oxides contained in the exhaust gas flow at a given operating state. Due to too small an addition of the reducing agent, the nitric oxides are not completely reduced at the SCR catalyst and, therefore, some are discharged to the environment as such.

Building on this discussed prior art, the present invention addresses the problem of further developing a method or a device such that the danger of an erroneous dosing due to the undetected presence of gaseous reducing agent, instead of the liquid one, is avoided.

The problem of gas bubbles at the input side of the dosing valve is solved according to the present invention by cooling the reducing agent supplied to the dosing valve in order to condense the gaseous phases of the reducing agent.

SUMMARY OF THE INVENTION

The primary aspect of the present invention is to cool the reducing agent, usefully $NH_3$, present at the dosing valve to a temperature such that bubbles of gaseous $NH_3$, entrained in the liquid $NH_3$ flow, are condensed so that only liquid $NH_3$ is present at the input side of the dosing valve.

Cooling the $NH_3$ supplied to the dosing valve is a measure which can be carried out without great effort in order to ensure that only liquid $NH_3$ is, in fact, present at the input side of the dosing valve.

It is especially advantageous and useful to employ a cooling device in which, directly after the delivery of an $NH_3$ dose, the $NH_3$ is at least partially vaporized and the heat necessary for the vaporization is withdrawn from the $NH_3$ conducted to the dosing valve, thereby performing the desired cooling. Such an implementation combines that the $NH_3$ dosed in liquid form and subsequently vaporized can be transported especially well line-tied to the exhaust gas system and, simultaneously with the vaporization, the cooling of the conducted $NH_3$ takes place for the condensation of the gaseous $NH_3$ phases contained in the $NH_3$ supply line.

To accomplish the vaporization process it is fundamentally not necessary to employ supplementary sets. Rather, it is sufficient if between the $NH_3$ supply line, connected at the input to the dosing valve, and the line leading from the dosing valve a pressure and/or temperature difference is present. As a rule, a pressure difference exists between these two lines since the $NH_3$ in an $NH_3$ tank is under pressure, which pressure is also present at the input side of the dosing valve, while, on the line leading from the dosing valve, only the exhaust gas counterpressure is present. The exhaust gas counterpressure as a rule is of a magnitude of a few 100 mbar, while the pressure in the $NH_3$ tank as a rule has a magnitude of several bars. Due to the low pressure in the dosing line (exhaust gas counterpressure) the vaporization of the dosed $NH_3$ is given, such that $NH_3$, possibly supplied in the gaseous state, becomes condensed through the cooling and the container pressure.

In order to prevent the cooling of the cooling device and of the dosing valve cooling the area where the automatically proceeding vaporization process takes place to such temperatures at which automatic vaporization of an $NH_3$ dose no longer occur, a useful further development is to provide means which prevent such excess cooling.

One method to prevent cooling of the vaporization area is to dispose in the proximity of the line leading away from the dosing valve an air supply, through which ambient air, or other air, is introduced into this line section. Supplying ambient air, which is generally much warming than the cooling point, into this line section results in the warming of the vaporization area and, therefore, immediate vaporization of that $NH_3$. If the area was too cold the $NH_3$ might possibly have not yet vaporized in line section, and the addition of ambient air ensures that the vaporization and the cooling process entailed therein is initiated or continues.

Supplying air can take place continuously or also at particular time intervals. Alternatively, or also in combination with this measure, it can be provided that only a portion of the dosed quantity of $NH_3$ acts on the cooling device such that in this manner excessive cooling down of the cooling device is avoided. Also conceivable as a method to prevent excess cooling is the intentional conduction of $NH_3$ gas bubbles to the input side of the dosing valve so that the heat generated during their condensation prevents excessive cooling of the cooling device.

Since in the vaporization process the cooling of the cooling device and of the dosing valve can take place to such temperatures at which complete vaporization of an $NH_3$ is not absolutely given, a useful further development is to provide a means to transport any still liquid $NH_3$ to the exhaust gas flow.

Other aspects of this invention will appear from the following description and appended claims, reference being made to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
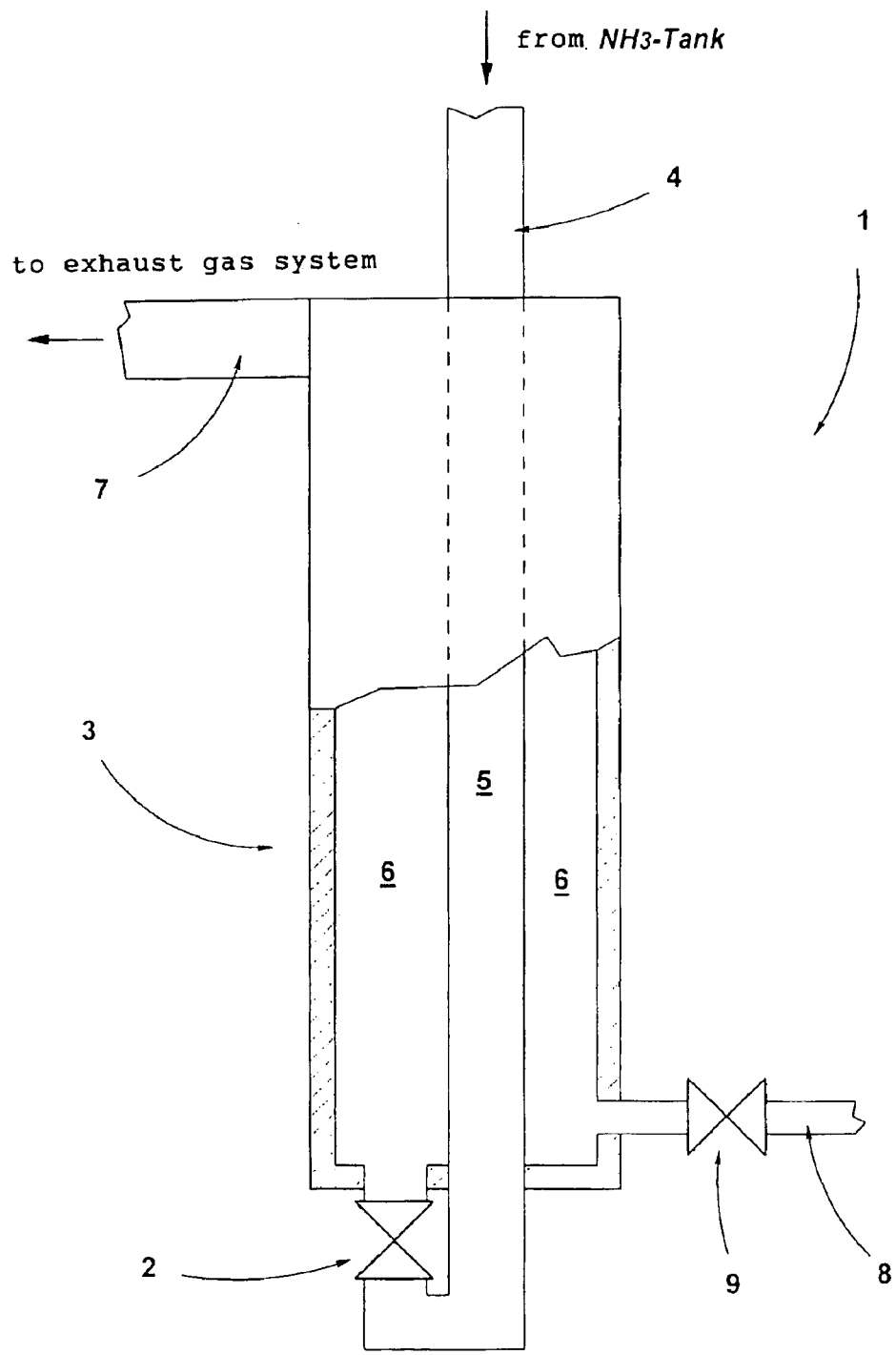
FIG. 1 a schematic representation one embodiment of a dosing device of the present invention FIG. 2 a schematic representation of a second embodiment of the dosing device of the present invention.

FIG. 1 depicts in schematic representation a dosing device 1 for dosing liquid $NH_3$ drawn from an $NH_3$ bottle for supplying the dosed $NH_3$ as a reducing agent for the denoxing of the exhaust gases of a diesel engine on a catalyst. The dosing device 1 comprises a dosing valve 2 and a cooling device denoted overall by 3. The cooling device serves for cooling the $NH_3$ supplied via an $NH_3$ supply line 4 from the $NH_3$ tank in order for $NH_3$ gas bubbles, possibly present in the $NH_3$ supply line 4, to condense with the goal that at the input side of the dosing valve 2 liquid $NH_3$ is always present.

As a heat exchanger the cooling device 3 is developed in the form of a double-walled tube, with the $NH_3$ supply line 4 terminating in an inner channel 5 of the cooling device 3. The inner channel 5 is connected to the input of the dosing valve 2. The output of dosing valve 2 terminates in an annular channel 6 of the cooling device 3. Line 7 is connected at the output side of the annular channel 6 for supplying the dosed $NH_3$ from the dosing valve 2 to the exhaust gas system succeeding a diesel engine. The annular chamber 6 serves in the cooling device 3 as a vaporizer chamber in which vaporizes the quantity of $NH_3$ delivered by the dosing valve 2 for injection into the exhaust gas system.

The vaporization process takes place automatically as a consequence of the pressure difference between the pressure in the $NH_3$ supply line 4, which corresponds to that of the $NH_3$ tank, and the considerably lower pressure in line 7 and the annular channel 6, which lower pressure is determined by the particular exhaust gas counterpressure. During the vaporization of the dosed $NH_3$ a quantity of heat is withdrawn from the environment and in particular from the inner channel 5 and the $NH_3$ contained therein. This results in the cooling of the $NH_3$ causing any $NH_3$ gas bubbles entrained in the $NH_3$, which is mostly in liquid form, to be condensed. Consequently, at the dosing valve 2 liquid $NH_3$ is present even if in the $NH_3$ supply line 4 $NH_3$ gas bubbles are supplied.

Near the dosing valve 2 an air supply line 8 terminates in the annular chamber 6 of the cooling device 3 via which ambient air can be introduced into the annular channel 6. Other air supplies could be used as well. The introduction of ambient air takes place to prevent the cooling device 3 from cooling too far if a specific temperature has been reached. The minimum cooling temperature in the depicted embodiment example is a temperature of −20° C. The actuation of an air valve placed into the air supply line can take place via a control system or also mechanically by utilizing, for example, a bimetal. Supplying ambient air which, as a rule, is much warmer than the cooling temperature of the cooling device 3 leads to an increase of the temperature in the annular channel 6 and, consequently, to rapid vaporization of liquid $NH_3$ residues possibly contained therein. This augments the supply of the dosed $NH_3$ into the exhaust gas system, and simultaneously the vaporization and cooling process is improved.

In the depicted embodiment example a temperature-dependent supply of ambient air takes place such that the temperature of the cooling device 3 is subjected to corresponding fluctuations. In the event that the ambient air is very cold, it is also possible to introduce warm exhaust gas to prevent the cooling of the cooling device 3 from cooling down too far by introducing ambient air into the annular channel 6.

Figure 2:
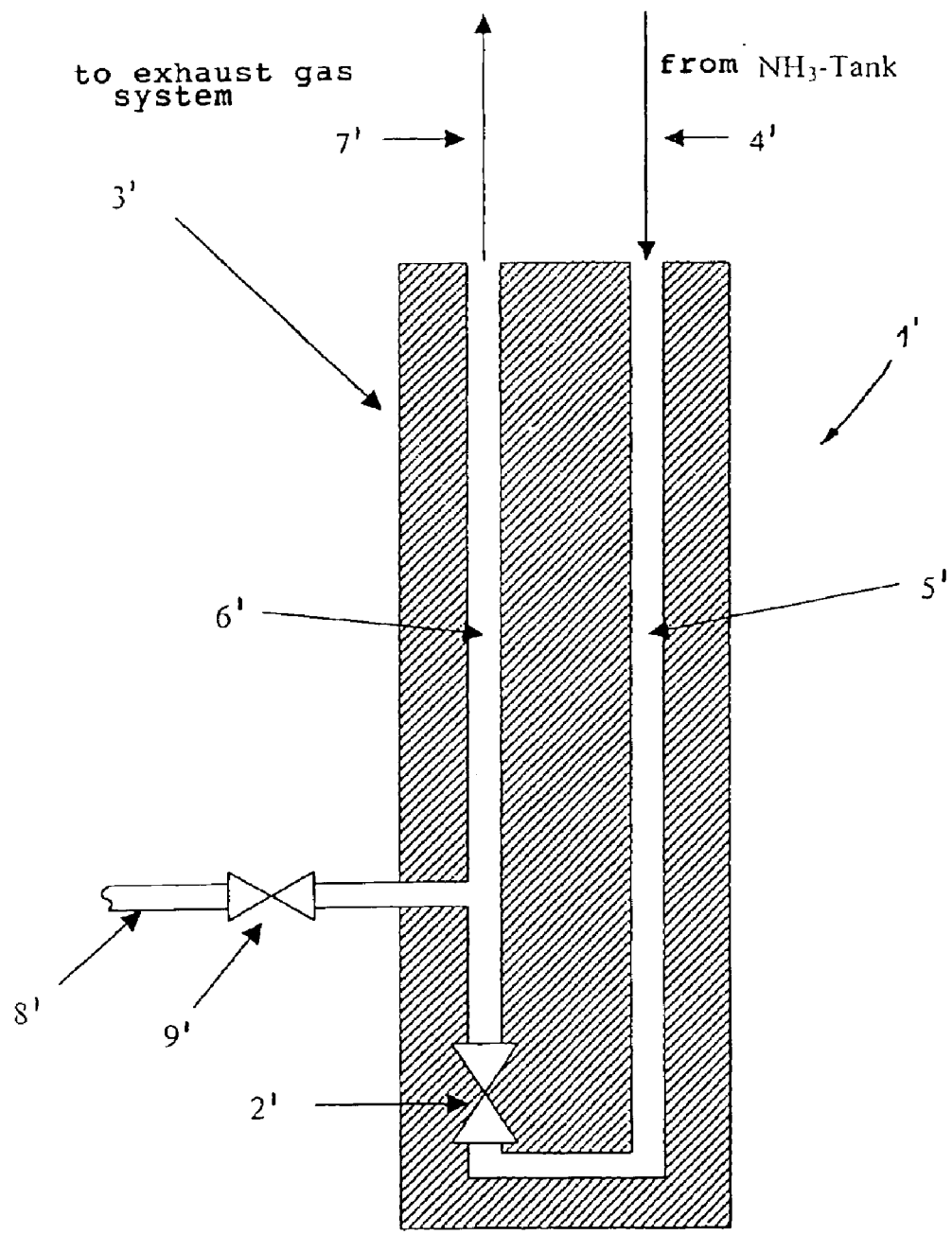

FIG. 2 depicts in schematic form a further dosing device 1', which is fundamentally structured like the dosing device 1 of FIG. 1. For this purpose identical elements are provided with identical reference symbols with an apostrophe '. In contrast to the implementation of the dosing device 1 of FIG. 1 the dosing device 1' does not involve a double-walled tube as a heat exchanger but rather two channels separated by a wall.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

LIST OF REFERENCE SYMBOLS 1, 1' Dosing device
2, 2' Dosing valve
3, 3' Cooling device
4, 4' $NH_3$ supply line
5, 5' Inner channel
6, 6' Annular channel
7, 7' Line
8, 8' Air supply line
9, 9' Air valve

I claim:

1. A method for dosing a liquid reducing agent for denoxing the exhaust gases of a diesel engine having a denoxing system, the method comprising:

supplying reducing agent to a dosing valve through a first supply line leading to an input side of the dosing valve;

delivering a specific quantity of reducing agent by means of the dosing valve for the introduction into an exhaust gas system of the diesel engine;

cooling the reducing agent supplied to the dosing valve by withdrawing heat at least from said first supply line through a cooling medium, whereby at least a part of delivered specific quantity of the reducing agent is utilized as the cooling medium; and introducing the specific quantity of reducing agent into the exhaust gas system of the diesel engine through a second supply line.

2. The method as claimed in claim 1, wherein the cooling of the reducing agent is performed by withdrawing heat required for vaporizing the specific quantity of the reducing agent.

3. The method as claimed in claim 1, wherein the reducing agent is cooled at the input side of the dosing device.

4. The method as claimed in claim 2, wherein the reducing agent is cooled at the input side of the dosing device.

5. The method as claimed in claim 1, 2, 3 or 4, further comprising the step of adding ambient air to the reducing agent delivered in doses.

6. The method as claimed in claim 1, 2, 3 or 4, wherein ammonia ($NH_3$) is utilized as the reducing agent.

7. The method as claimed in claim 5, wherein ammonia ($NH_3$) is utilized as the reducing agent.

8. A device for dosing a liquid reducing agent for the supply into the exhaust gas system of a diesel engine having a denoxing system, the device comprising:
   a tank holding the reducing agent;
   a dosing valve having an input side and an output side;
   a first supply line for the reducing agent leading from the tank to the input side of the dosing valve:
   a second supply line for the reducing agent leading from the output side of the dosing valve to the exhaust gas system; and
   a cooling device on the first supply line on the input side of the dosing valve for cooling at least the first supply line at the input side of the dosing valve by means of a cooling medium, wherein at least a part of the reducing agent delivered by means of the dosing valve for the introduction into the exhaust gas system of the diesel engine is utilized as the cooling medium.

9. Device as claimed in claim 8, wherein:
   at least one of the pressure or temperature conditions on the output side of the dosing valve are different from the at least one of the pressure or temperature conditions at the input side of the dosing valve, such that due to the at least one of the pressure and/or temperature difference between the two sides of the dosing valve that with the delivery by the dosing valve of reducing agent the latter, alter it is delivered, vaporizes at least partially; and
   the second supply line attached to the output side of the dosing valve being disposed such that the heat withdrawn from the environment during the vaporization of the reducing agent is withdrawn from the reducing agent contained in the input side to the dosing valve.

10. Device as claimed in claim 9, further comprising an air supply connecting into the second supply line succeeding the dosing valve and in proximity to the output of the dosing valve functioning to supply ambient air into the second supply line.

11. The device as claimed in one of claims 8 to 10, wherein ammonia ($NH_3$) is utilized as the reducing agent.

12. The device as claimed in one of claims 8 to 10, wherein the cooling device further comprises:
    a block with a first channel functioning as the first supply line and succeeding the dosing valve;
    a second channel functioning as the second supply line, said channels being connected with one another such that they conduct heat; and
    the dosing valve being disposed between the two channels.

13. The device as claimed in claim 12, wherein ammonia ($NH_3$) is utilized as the reducing agent.

14. Device as claimed in one of claims 8 to 10, wherein the cooling device further comprises:
    a heat exchanger having as a double-walled tube with an inner channel serving as the first supply line and an outer annular channel serving as the second supply line succeeding the dosing valve, with the dosing valve being disposed in a connection between the inner channel and the outer annular channel.

15. The device as claimed in claim 14, wherein ammonia ($NH_3$) is utilized as the reducing agent.

* * * * *